United States Patent
McGowan et al.

(10) Patent No.: US 8,036,642 B2
(45) Date of Patent: Oct. 11, 2011

(54) WIRELESS NETWORK AND METHOD OF TRANSMITTING CONTENT FROM LOCALLY STORED SERVER

(75) Inventors: James W. McGowan, Whitehouse Station, NJ (US); Michael C. Recchione, Nutley, NJ (US)

(73) Assignee: Alcatel Lucent, Paris (FR)

( * ) Notice: Subject to any disclaimer, the term of this patent is extended or adjusted under 35 U.S.C. 154(b) by 1047 days.

(21) Appl. No.: 11/819,970

(22) Filed: Jun. 29, 2007

(65) Prior Publication Data

US 2009/0005020 A1   Jan. 1, 2009

(51) Int. Cl.
    *H04M 12/58* (2006.01)
(52) U.S. Cl. .............. 455/412.1; 455/414.1; 455/414.3; 455/422.1; 455/428; 370/469; 370/471; 370/473; 370/474
(58) Field of Classification Search .............. 455/414.3, 455/412.1, 412.2, 414.1, 422.1; 370/469, 370/471, 473–476
    See application file for complete search history.

(56) References Cited

U.S. PATENT DOCUMENTS

| | | | | |
|---|---|---|---|---|
| 5,825,759 A * | 10/1998 | Liu | | 370/331 |
| 6,996,393 B2 * | 2/2006 | Pyhalammi et al. | | 455/412.1 |
| 7,151,934 B2 * | 12/2006 | Nishimura et al. | | 455/442 |
| 7,161,934 B2 * | 1/2007 | Buchsbaum et al. | | 370/382 |
| 7,302,465 B2 * | 11/2007 | Ayres et al. | | 709/203 |
| 7,483,405 B2 * | 1/2009 | Emond et al. | | 370/328 |
| 7,606,205 B2 * | 10/2009 | Ranta-Aho et al. | | 370/335 |
| 7,654,462 B2 * | 2/2010 | Casey | | 235/472.01 |
| 7,738,426 B2 * | 6/2010 | Smith et al. | | 370/331 |
| 2002/0097728 A1 * | 7/2002 | Hinderks et al. | | 370/395.52 |
| 2003/0060190 A1 * | 3/2003 | Mallart | | 455/414 |
| 2003/0120817 A1 * | 6/2003 | Ott et al. | | 709/249 |
| 2005/0094586 A1 * | 5/2005 | Zhang et al. | | 370/310 |
| 2005/0130586 A1 * | 6/2005 | Gnuschke et al. | | 455/3.06 |
| 2005/0232149 A1 * | 10/2005 | Matuoka et al. | | 370/230 |
| 2006/0223520 A1 * | 10/2006 | Laroia et al. | | 455/422.1 |
| 2007/0025295 A1 * | 2/2007 | Kono | | 370/331 |
| 2007/0097916 A1 * | 5/2007 | Eyuboglu et al. | | 370/329 |
| 2008/0068253 A1 * | 3/2008 | Mehta et al. | | 342/115 |
| 2008/0101304 A1 * | 5/2008 | Alfred et al. | | 370/336 |
| 2009/0005098 A1 * | 1/2009 | McGowan et al. | | 455/517 |
| 2009/0098892 A1 * | 4/2009 | Trogolo et al. | | 455/466 |
| 2009/0154356 A1 * | 6/2009 | Wiemann et al. | | 370/236 |

* cited by examiner

*Primary Examiner* — Kent Chang
*Assistant Examiner* — Magdi Elhag
(74) *Attorney, Agent, or Firm* — Harness, Dickey & Pierce, P.L.C.

(57) ABSTRACT

One example embodiment of the present invention discloses a method of delivering content from a base station of a wireless network to a mobile station including receiving a request for content from a mobile station, accessing the requested content from content stored in association with the base station, and transmitting the requested content to the mobile station.

11 Claims, 4 Drawing Sheets

WIRELESS NETWORK AND METHOD OF TRANSMITTING CONTENT FROM LOCALLY STORED SERVER

BACKGROUND OF THE INVENTION

Handling data transmission between a wireless network and a mobile station has been a developing concern in third generation (3G) wireless communication systems such as Universal Mobile Telecommunications System (UMTS) and Evolution-Data Optimized or Evolution-Data only (EV-DO).

FIG. 1 illustrates a simplified conventional wireless network 100. The conventional wireless network 100 may include a core network 60, a radio network controller (RNC) 40 connected to the core network 60, and a plurality of mobile base transceiver stations (BTS) 20 also connected to the RNC 40. Together the BTSs 20 and RNC 30 are known as an access network (AN). The BTSs 20 may include RF components for transmitting and receiving signals. The RNC 40 is a component that interfaces with the core network 60, controls the radio transmitters and receivers in the BTSs 20, and may perform other radio access and link maintenance functions. The connection between a BTS 20 to the RNC 30 is known as a "backhaul" link. Mobile stations 10 such as cell phones, wireless laptops, person digital assistant (PDA), and other wireless devices may communicate with a BTS 20 via a radio link or "air interface". Recently, the capacity of the air interface has exceeded the capacity of the backhaul network, shifting the historical bottleneck from air (wireless) to wire.

Conventionally, the majority of the backhaul links for the BTS 20 are T1 lines with roughly 1.5 Mbps of bandwidth, compared to over 50 Mbps for an ideal air interface between the BTS 20 and the mobile station 10. To deliver advanced services and data such as video and music content, either higher-bandwidth fiber optics or additional T1 lines must be connected to each of the BTSs 20. However, optical fiber is expensive and deployment of additional T1 lines has been slower than anticipated. Also, service assurance policies on T1 lines make them prohibitively expensive. Accordingly, new mobile services are either not offered, or discontinued, if the demands for the services are too great—an ironic situation for service providers trying to sell these new services. Video in particular requires substantial amount of bandwidth, so widespread deployment may not be economically supported because of the backhaul bottleneck.

SUMMARY OF THE INVENTION

Example embodiments of the present invention relate to a wireless network including a base station, and a method of locally storing content and transmitting the content to a mobile station.

In an example embodiment of the present invention, a method of delivering content from a base station of a wireless network to a mobile station including receiving a request for content from a mobile station, accessing the requested content from content stored in association with the base station, and transmitting the requested content to the mobile station.

In another example embodiment of the present invention, a method of delivering content from a base station of a wireless network to a mobile station including receiving a request for content from a mobile station, accessing the requested content from content stored in association with the base station, inserting the access content on a first protocol stack, adding a sequential number to a header of the first protocol stack indicating an amount of data in the first protocol stack, and transmitting the first protocol stack to the mobile station. In this example embodiment, content is not accessed from a core network.

In an example embodiment of the present invention, a base station in a wireless network for delivering content to a mobile station including a local storage server configured to store content, and a mobile relay (MR) configured to access stored content, and transmit the accesses content to the mobile station in response to a request for content.

In yet another example embodiment of the present invention, a base station in a wireless network for delivering content to a mobile station including a local storage server configured to store content, and a mobile relay (MR) configured to insert stored content on a first protocol stack, add a sequential number to a header of the first protocol stack indicating an amount of data in the first protocol stack, and transmit the first protocol to the mobile station in response to a request for content.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

DETAILED DESCRIPTION OF THE EXAMPLE EMBODIMENTS

Figure 1:
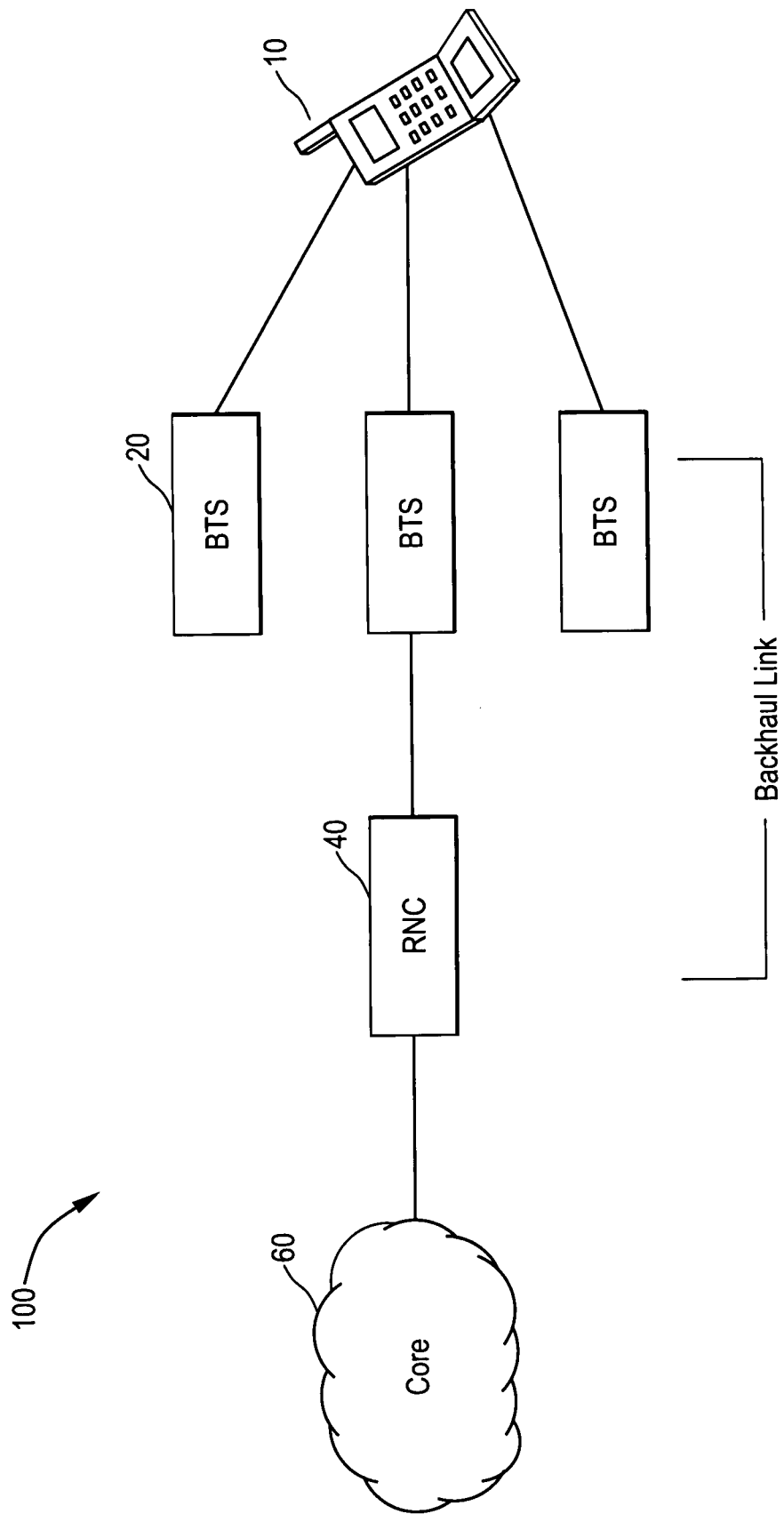
FIG. 1 illustrates a simplified conventional wireless network.

Although example embodiments of the present invention will be described with reference to an EV-DO network, a person of ordinary skill will recognize the present invention may be applied to other telecommunication systems, for example but not limited, to Universal Mobile Telecommunication System (UMTS) and WiMax. Throughout the specification and drawings and unless specifically identified and defined, like and similar elements will be identified with the same reference numeral.

It will be understood that, although the terms first, second, third etc. may be used herein to describe various elements, components, regions and/or sections, these elements, components, regions and/or sections should not be limited by these terms. These terms may be only used to distinguish one element, component, region, or section from another region or section. Thus, a first element, component, region or section discussed below could be termed a second element, component, region or section without departing from the teachings of the present invention.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-section illustrations that may be schematic illustrations of idealized embodiments (and intermediate structures). Thus, the example embodiments should not be construed as limited to the particular location and arrangements illustrated herein but are to include deviations thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
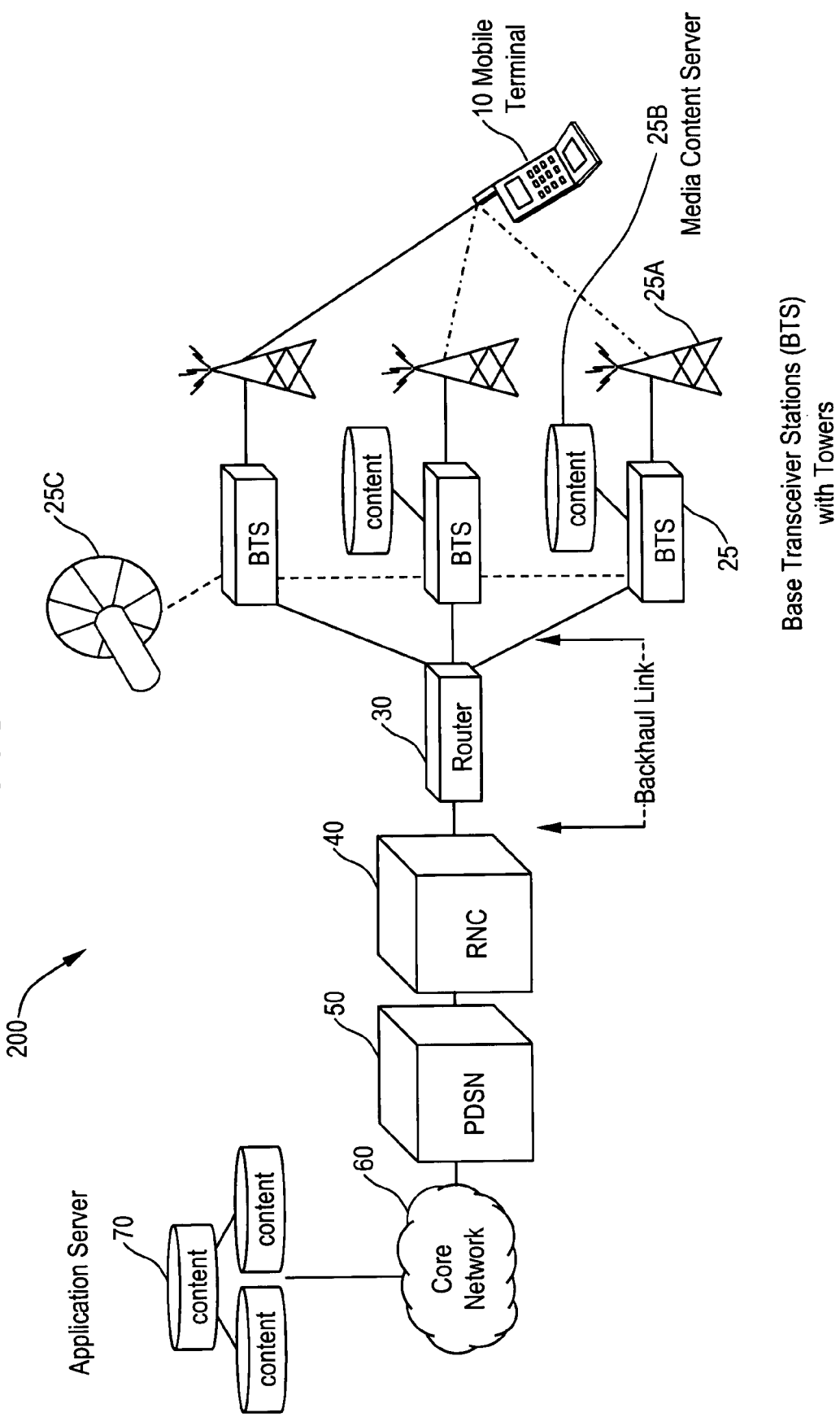
FIG. 2 illustrates a base station of an example embodiment of the present invention.

FIG. 2 illustrates a wireless network 200 of an example embodiment of the present invention. A mobile station 10 may be in contact with a plurality of base station transceivers (BTSs) 25, for example, contact with radio towers 25A of the BTSs 25 via an air interface. The mobile station 10 may be a cell phone, personal computer, personal digital assistant (PDA) or other similar devices equipped for wireless access to the wireless network 200. The mobile station 10 monitors the radio signal strength among the plurality of BTSs 25 (active set). The signal strength is reported to a radio network controller (RNC) 40, and then one of a plurality paths is selected for the mobile station 10 to communicate with a core network 50. The BTS 20 may be connected to the RNC 40 through a router 30. The RNC 40 is further connected to a packet data service node (PDSN) 50, which is connected to the core network 60. The PDSN 50 acts as a connection point between the access network (BTS 25 and RNC 40) and the core network 60. The PDSN 50 is responsible for managing Point-to-Point Protocol (PPP) sessions between the core network 60 and the mobile station 10. The core network 60 may be connected to a plurality of application servers 70. The application servers 70 may provide a Multimedia Broadcast Multicast Service (MBMS) including video and music content. Throughout the disclosure, the term content and media may be used interchangeably.

As disclosed above, the backhaul link connecting the BTS 25 to the RNC 40 is currently the bandwidth bottleneck between the end user (mobile station 10) and the content (application servers 70). Traditionally, content stored on application servers 70 should traverse the backhaul link. However, in an example embodiment of the present invention, a local content server 25B has been placed at each of the plurality of BTSs 25. In another example embodiment of the present invention, a secondary source may supply content may be feed to the plurality of BTSs 25, such as from a satellite receiver 25C. In an example embodiment of the present invention, a BTS 25 may include a satellite receiver 25C for use in receiving video and/or data. Since most video services (and many data services) are updated relatively infrequently, and since most such services require that the majority of traffic be sent from a core network 60 to a mobile station 10 (as opposed to from the mobile station 10 to the core network 60), delivering such services over a satellite channel may advantageously provide an opportunity to offer broadcast services, for example, with minimal use of the existing backhaul network, thereby advantageously eliminating the bottleneck typically created by the limited bandwidth of the backhaul network which is conventionally used to supply such video and/or data signals.

In detail, video and/or data signals may be received by the BTS 25 through a satellite dish (not shown). The satellite dish may be placed between the mobile station 10 and a primary content resource (e.g., a core network 60), with a controller (not shown) which manages communications with both resources.

However, simply storing the content locally (e.g., in the BTS 25) will not solve the bottleneck problem, because the content will have to be delivered from a local content server 25B on the BTS 25 to the core network 60 and then back down to the mobile station 10, which doubles the bandwidth utilization on the backhaul link.

In example embodiments of the present invention, the plurality of BTSs 25 intercept any request for content stored at the application servers 70, and sends the requested content to the requester. It will be obvious to a person of ordinary skilled in the art that content of the application serves 70 may be updated at the local content server 25B or a satellite receiver 25C during off-peak hours. It will also be obvious that some information, such as signaling for authentication, billing information, etc. may still be sent to the core network 60. However, the media itself is the bulk of the traffic, and removing the media from the backhaul link will have the most significant impact on limitation of the bandwidth.

Figure 3:
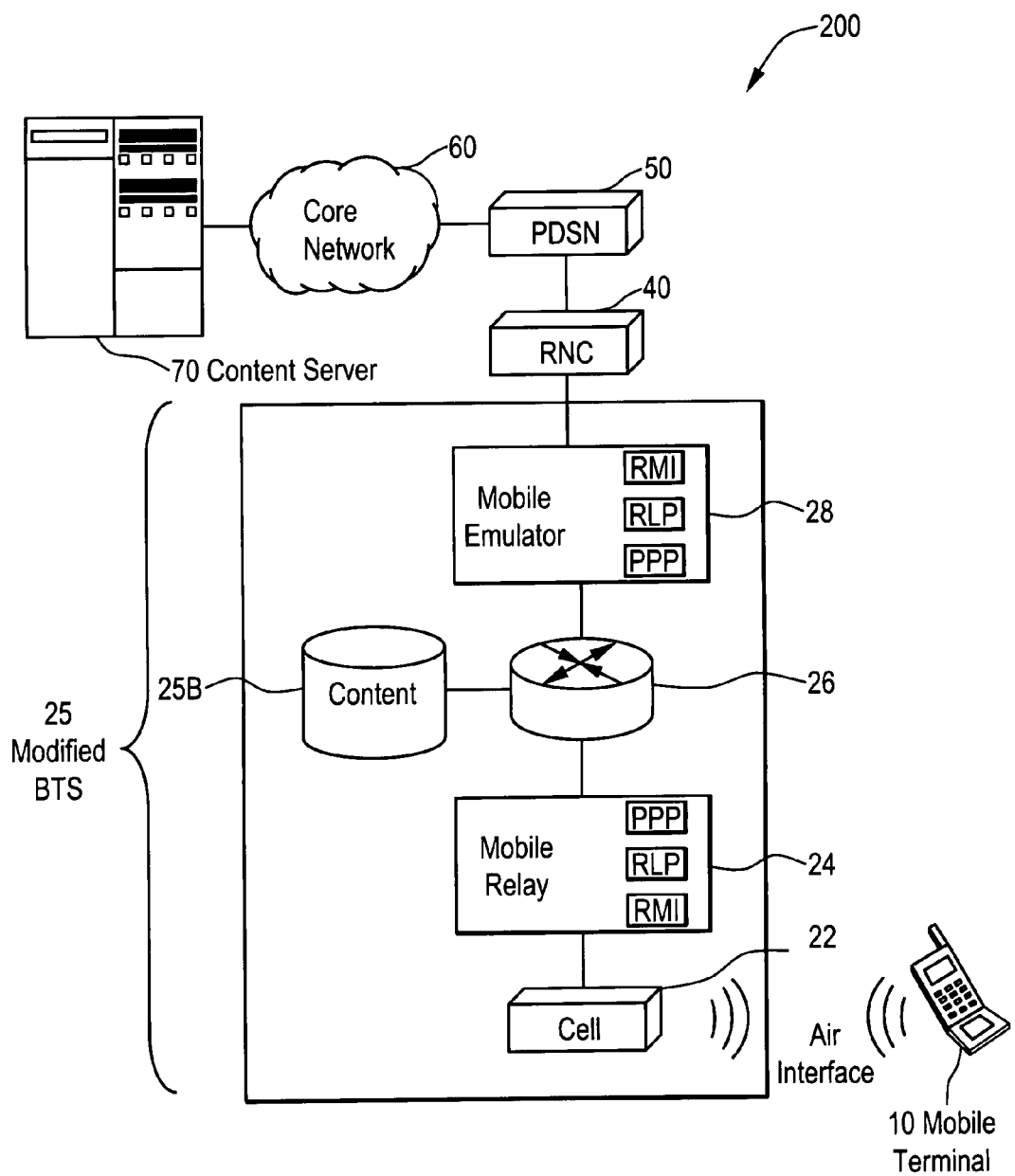
FIG. 3 illustrates a base station of an example embodiment of the present invention in greater detail.

FIG. 3 illustrates the transceiver base station of FIG. 2 in greater detail. It is appreciated by a person of ordinary skill in the art that an end-user (mobile station 10) may move between a plurality of BTSs 25 over time. Therefore, an RNC 40 may mediate all content delivery to the mobile station 10, and track which segments of the content have been delivered and which segments remain to be delivered to the mobile station 10. In example embodiments of the present invention, the mobile station 10 and the RNC 40 believe they are talking directly with one another, but in fact, the BTS 25 between the mobile station 10 and RNC 40 is actually performing this task. Example embodiments of the present invention allow local content hosting in a way that is compatible with existing network components and mobile stations 10, and only requires minor modifications to the BTS 25 and application servers 70.

Referring to FIG. 3, in the BTS 25 a mobile relay (MR) 24 communicates with the mobile station 10, while a mobile emulator (ME) 28 communicates with the RNC 40. The BTS 25 may further include a router 26. The router 26 may route information (e.g., protocol stack) between the MR 24 and a local content server 25B, between the MR 24 and the ME 28, and between the ME 28 and local content server 25B. The BTS 25 also include a cell 22. The cell 22 communicates with the mobile station via an air interface.

Details of the communications and details of how local content may be inserted at the mobile relay 24 require a discussion of "protocol stacks".

A protocol may be considered as a method of connecting and transferring information between two endpoints. For the purpose of describing a hierarchical network, a protocol requires that information be placed as a payload in a "packet", and that each packet have "header" information implementing the protocol. The packet is both the payload and the header. In the hierarchical network, multiple protocols may be used simultaneously in a hierarchy. For example, a Radio Link Protocol (RLP) provides a scheme for retransmitting packets across an inherently unreliable radio link to improve transmission reliability. An RLP header is placed on data to be transmitted, and this information is sent across an air interface. The payload for an RLP packet is itself a portion of a header and payload for a PPP packet, which mediates the connection between the mobile station 10 and the PDSN 50.

A protocol stack may be considered as simply a nested series of payloads and headers. The use of a layered stack allows for communication to easily flow across different physical interfaces (e.g., air and wire), and different networks. For example, two PC applications may talk to each other using their own protocol, which itself is placed inside the Internet Protocol (IP) to move information across the Internet. The IP may be layered on top of physical protocols that address the unique requirements of various air and wire interfaces. An application is not concerned with physical interfaces to which it is completely blind. Likewise, the physical interfaces are not concerned with the details of the application protocol, which it blindly treats as generic payloads. This arrangement allows a great deal of flexibility and underlies most modern networks.

Remote method invocation (RMI) is a protocol between a cell 22 and the RNC 40 for bearer path traffic and associated signaling (e.g., the voice phone calls and the necessary overhead for the voice calls). For example, on a voice-over-IP call the mobile station 10 will generate a voice frame, and place it in a protocol stack, usually RTP/UDP/IP/PPP (meaning the voice frame will have a real time transport (RTP) header, a user datagram protocol (UDP) header, an IP header, and then a PPP header placed on it). The PPP frame will be divided up into smaller frames, with each smaller frame receiving its own RLP header. The RLP frame is sent over the air. The process in reverse is much the same, with RLP between the RNC 40 and cell 22. In addition, some call-related information may be sent on RMI frames between the cell 22 and the RNC 40 (e.g., messages related to handoffs), but those do not contain RLP frames.

In example embodiments of the present invention, the BTS 25 (e.g., the ME 28 and MR 24) re-assembles the PPP frame from the smaller PPP frames, extracts or adds information as needed, re-divides everything into RLP frames, adds RMI headers, and forwards them. This is true in either direction, from the RNC 40 to the cell 22, or reverse.

Content may be inserted by the MR 24 either by (a) manipulating header information at one of the layers and inserting packets with new content, or (b) terminating one of the protocols in both directions, and acting as a "back-to-back" agent in the middle of the communication stream. In other words, in the latter method the BTS 25 will appear to be the mobile station 10 to the RNC 40, and the BTS 25 will appear to be the RNC 40 to the mobile station 10. If content is inserted into a stream, the insertion may be made by a conventional method of adding an appropriate header to the content. In the former method, headers of the content passing through should be manipulated to allow for the new content. For example, if the content is inserted at Layer 2, the headers from the RNC 40 will include a running count of the number of bytes in each header as a unique number to identify the packet. When new content is inserted at the BTS 25, those numbers should be incremented to account for the bytes in the new packets. However, when a request is made by the mobile station 10 to retransmit a particular packet from the RNC 40, the BTS 25 should convert the mobile station's 10 request into the number the RNC 40 will recognize, i.e., the number which had been sent by the RNC 40. Recall that the RNC 40 is not aware of the content inserted by the BTS 25. For example, assume that the RNC 40 sent two 1000 byte frames numbered 1 and 1001, and the BTS 25 inserts 500 bytes in-between, then the second RNC packet should be renumbered to 1501. When the mobile station 10 requests for a retransmission of 1501, the BTS 25, more particularly, the ME 28 translates the number of requests when communicating with the RNC 40. If a forward path from the RNC 40 to the mobile station 10 is on a different BTS 25 than a reverse path from the mobile station 10 to the RNC 40, due to the movement of the mobile station 10, this process becomes more complicated.

A practical example will be described to illustrate the potential problems discussed above. An issue may arise because the RNC 40 is not aware that locally stored content had been added by the BTS 25, more particularly, the MR 24, and sent to the mobile station 10, which throws off numbering schemes. All content sent to the mobile station 10 have a sequential number in a RLP header indicating how much data is being sent. For example, if all RLP frames were 100 bytes, the RLP numbers would be 1, 101, 201, . . . , etc. If the locally stored content is simply sent by the BTS 25, and if a user clicks a link back to a web page on some application server 70 in the core network 60, the RNC 40 and the mobile station 10 will be in a disagreement with regard to the label of those packets. If a new session is started by downloading content of 1,000 bytes from the application server 70, then the mobile station 10 would expect 1,001 as the header, but the RNC 40 would send 1. Therefore, the ME 28 and the MR 24 coordinate the numbering scheme so that both the RNC 40 and the mobile station 10 are in an agreement.

Although any Layer of the protocol stack can be potentially terminated (e.g., decoded) or modified (e.g., add content), in the example embodiments of the present invention Layer 3 (i.e., PPP) is terminated.

Modifying Layer 2 (i.e., RLP) as described above is complicated by the fact that the mobile station 10 may be connected with two (2) different BTS 25 at the same time. One of the BTSs 25 may be connected with the mobile station 10 on the forward link to send information down to the mobile station 10, and another BTS 25 may be connected with the mobile station 10 on the reverse link to receive information from the mobile station 10 destined for the core network 60. This complicates the renumbering scheme, which keeps renumbering information synchronized between the BTSs 25, since requests for retransmissions may not be received by the BTS 25 that transmitted and renumbered the original content.

Layer 3 does not retransmit. Terminating Layer 3 also gives access to IP addresses and HTTP requests for content being requested; this type of information is not available in Layer 2. If a request is made for local content, Layer 3 may be used to direct the traffic from a local content server 25B to the MR 24 directly, and no complex renumbering and manipulation of headers is required. In this scenario, when the BTS 25 correctly receives the information, the PDSN 40 believes that the mobile station 10 has received the information, and acts accordingly. The reverse is true from the perspective of the mobile station 10.

As described above, the content may originate from the local content server 25B, or a secondary source, for example, a satellite receiver 25C. In either case, the local content server 25B may be considered a media gateway to use, for example, IP Multimedia Subsystem (IMS) terminology. Media Gateways enable multimedia (e.g., content) communications across 3G multiple transport protocols, for example, asynchronous transfer mode (ATM) and IP. As such, it may be assigned a private IP address (an Internet address only valid within the BTS 25), and the application servers 70 may send the mobile station 10 a message that the content is stored at a particular IP address. Since the BTS 25 intercepts this message, the BTS 25 can resolve the address to its own local content server 25B. With this method, all local content servers 25B may have the same IP address, and a handover only requires that the user's current place in the content is passed between BTSs 25 during a handoff. For example, a content status record may contain information regarding a user's place in the content and is transferred from the passing BTS to the recipient BTS during a hand-off. The content status record may include a Unicast Access Terminal Identifier (UATI) that uniquely identifies the terminal, in a known manner; a region or local code for the passing BTS that specifies the "region" that the BTS inhabits; a content identifier and a byte offset within the identifier for the content that has been sent to the terminal. During a hand-off, there is some information about the flow of content in the Radio Link Protocol (RLP) used between a mobile station 10 and the RNC 40. Content is placed in numbered RLP packets by the RNC 40, and sent to the appropriate BTS 25 for delivery to the mobile station 10. The BTS 40 will often build a large queue of RLP packets destined for the mobile station 10. When the mobile station triggers a handoff from the original BTS 25 to a new BTS 25, the original BTS 25 informs the RNC 40 of the RLP packets that have been delivered. The RNC 40 then sends subsequent packets to the new BTS 25. For example, if the RNC 40 delivers RLP packets 101 through 110 to the old BTS 25 and the mobile station 10 sends a handoff notification after RLP packets 101-103 have been delivered, then the RNC 40 retransmits packets 104-110 to the new BTS 25.

A handoff does not require that the mobile station 10 establish a new IP connection with the new local content server 25B simply because the address has (BTS) changed. This means that the components that support the traditional architecture do not need to be modified in any way to re-establish a connection, and the time to re-establish the connection is saved. This solution may also apply in non-IMS architectures, and for other signaling protocols, although the terminology will change.

Figure 4:
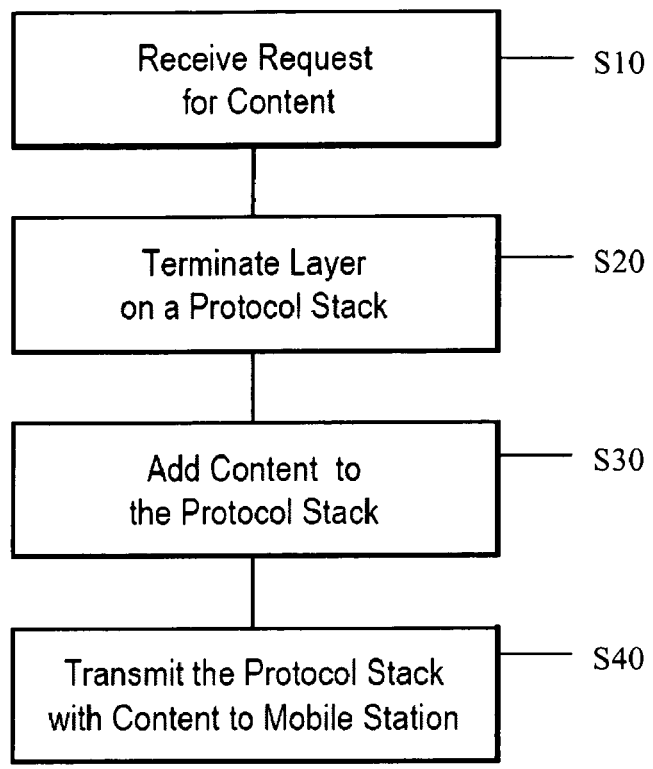
FIG. 4 is a flow chart illustrating a method of an example embodiment of the present invention.

With reference with FIGS. 3 and 4, an example embodiment of the present invention will be described. FIG. 4 is a flow chart illustrating an example embodiment of the present invention.

A mobile station 10 sends a request for content to a core network 60 via a BTS 25. A MR 24 located in the BTS 25 receives the request for content as a protocol stack at S10. Assuming that the requested content is locally stored, the MR 24 terminates the protocol stack at S20 and adds the content to the protocol stack at S30. The content may be stored in a local content server 25B or in a satellite receiver 25C. The MR 24 may terminate the protocol stack at Layer 2 or Layer 3 and add the content thereto. At this time, the MR 24 and ME 28 keep track of a sequence number added to a header of the protocol stack. The MR 24 then transmits the protocol stack with content to the mobile station 10 at S40.

Figure 5:
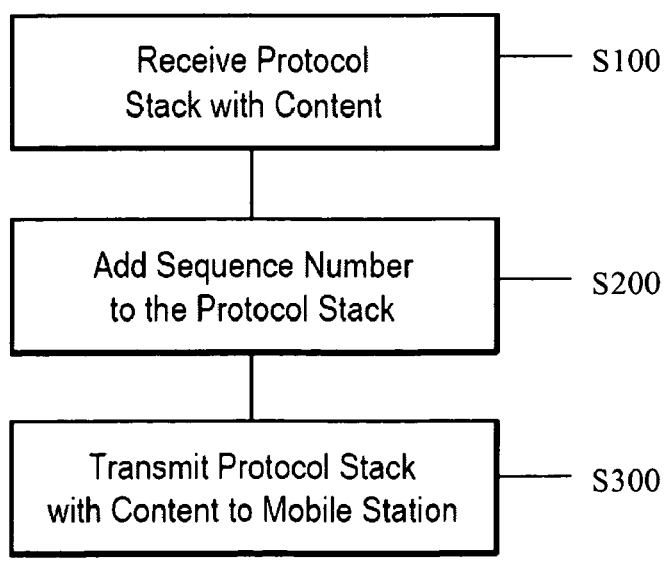
FIG. 5 is a flow chart illustrating another method of an example embodiment of the present invention.

With reference with FIGS. 3, 4 and 5 an example embodiment of the present invention will be described. FIG. 5 is a flow chart illustrating another example embodiment of the present invention.

A mobile station 10 may request content not locally stored in a BTS 25. In this example embodiment, the requested content may be retrieved from an application server 70 via a core network 60 in the conventional manner. An RNC 40, not knowing whether the BTS 25 had previously sent content to the mobile station 10, adds a sequence number to a protocol stack indicating how much data is being sent to the mobile station 10. However, as disclosed above, the sequence number may not match the sequence number expected by the mobile station 10.

A ME 28 located in the BTS 25 receives the application server content at S100. The ME 28 knowing the sequence number added by a MR 24 (i.e., how much data had been sent by the BTS 25 to the mobile station 10), adds to the sequence number of the stack protocol the total sequence number added by the MR 24 at S200. Then the MR 24 transmits the application server content to the mobile station 10 at S300.

Example embodiments of the present invention being thus described, it will be obvious that the same may be varied in many ways. For example, while above-described with respect to EV-DO, it will be appreciated that similar methodologies may be applied in any wireless communication system (e.g., a UMTS system).

Such variations are not to be regarded as a departure from the example embodiments of the invention, and all such modifications are intended to be included within the scope of the invention.

What is claimed is:

1. A method of delivering content from a base station of a wireless network to a mobile station, comprising:
   receiving a request for content from a mobile station;
   accessing the requested content from content stored in association with the base station;
   inserting the requested content into Layer 3 of a first protocol stack;
   transmitting the requested content to the mobile station;
   adding a sequential number to a header of the first protocol stack indicating an amount of data in the first protocol stack after the inserting step;
   receiving a second protocol stack including content stored in a core network;
   adding the sequential number to a sequential number added by a radio network controller (RNC) on a header of the second protocol stack; and
   transmitting the core network content to the mobile station, wherein the requested transmitted content is not accessed from the core network.

2. A method of delivering content from a base station of a wireless network to a mobile station, comprising:
   receiving a request for content from a mobile station;
   accessing the requested content from content stored in association with the base station;
   inserting the access content in a first protocol stack, the accessed content being inserted into Layer 3 of the first protocol stack;
   adding a sequential number to a header of the first protocol stack indicating an amount of data in the first protocol stack;
   transmitting the first protocol stack to the mobile station;
   receiving a second protocol stack including content stored in a core network;
   adding the sequential number to a sequential number added by a radio network controller (RNC) on a header of the second protocol stack; and
   transmitting the core network content to the mobile station.

3. The method of claim 2, further comprising:
   receiving information from the core network that the content is stored in an IP address; and
   assigning the IP address to a local content server.

4. The method of claim 2, further comprising:
   passing a location point of the transmission of the requested content to a target base station during a hand-off.

5. The method of claim 2, further comprising:
   storing the content in at least one of a base station transceiver (BTS) and a satellite receiver.

6. A base station in a wireless network for delivering content to a mobile station comprising:
   a local storage server configured to store content;
   a mobile relay (MR) configured to access stored content, inserting the accessed content in a first protocol stack, the accessed content being inserted into Layer 3 of the first protocol stack ,and transmit the accessed content to the mobile station in response to a request for content, the MR configured to add a sequential number to a header of the first protocol stack indicating an amount of data in the first protocol stack; and a mobile emulator (ME) configured to receive a second protocol stack including a content stored in a core network, add the sequential number to a sequential number added by a radio network controller (RNC) on a header of the second protocol stack, and transmit the core network content to the mobile station, wherein the local storage server is not provided in a core network.

7. The base station of claim 6, wherein the content is stored in at least one of a base station transceiver (BTS) and a satellite receiver.

8. A base station in a wireless network for delivering content to a mobile station comprising:

a local storage server configured to store content;

a mobile relay (MR) configured to insert stored content on Layer 3 of a first protocol stack, add a sequential number to a header of the first protocol stack indicating an amount of data in the first protocol stack, and transmit the first protocol to the mobile station in response to a request for content; and a mobile emulator (ME) configured to receive a second protocol stack including a content stored in a core network, add the sequential number to a sequential number added by a radio network controller (RNC) on a header of the second protocol stack, and transmit the core network content to the mobile station.

9. The base station of claim 8, wherein the mobile relay is configured to terminate the first protocol stack at Layer 3.

10. The base station of claim 8, wherein the content is stored in at least one of a base station transceiver (BTS) and a satellite receiver.

11. A base station in a wireless network for delivering content to a mobile station comprising:

a local storage server configured to store content;

a mobile relay (MR) configured to insert stored content on a first protocol stack, add a sequential number to a header of the first protocol stack indicating an amount of data in the first protocol stack, and transmit the first protocol to the mobile station in response to a request for content;

a mobile emulator (ME) configured to receive a second protocol stack including a content stored in a core network; and a router configured to route at least one of the content to the MR, the first protocol stack from the MR to the ME, and the second protocol stack from the ME to the MR.

* * * * *